United States Patent
Leibbrandt et al.

(10) Patent No.: US 8,346,445 B2
(45) Date of Patent: Jan. 1, 2013

(54) METHOD FOR REACHING A NEUTRAL POSITION OF A GEARSHIFT FORK IN A SHIFT TRANSMISSION

(75) Inventors: Martin Leibbrandt, Bedburg (DE); Stefan Huepkes, Viersen (DE); Helmuth Bosch, Leverkusen (DE)

(73) Assignee: Getrag Ford Transmissions GmbH, Cologne (DE)

( * ) Notice: Subject to any disclaimer, the term of this patent is extended or adjusted under 35 U.S.C. 154(b) by 561 days.

(21) Appl. No.: 12/253,801

(22) Filed: Oct. 17, 2008

(65) Prior Publication Data

US 2009/0105913 A1   Apr. 23, 2009

(30) Foreign Application Priority Data

Oct. 23, 2007 (EP) .................................... 07119124

(51) Int. Cl.
*F16H 59/04* (2006.01)
*G06F 17/00* (2006.01)

(52) U.S. Cl. ........................................................ 701/51

(58) Field of Classification Search ................... 701/50, 701/51, 55, 60, 62, 63, 65, 67, 68; 192/3.51, 192/3.63; 74/473.1, 473.21, 473.25, 473.26, 74/473.28

See application file for complete search history.

(56) References Cited

U.S. PATENT DOCUMENTS

| 5,626,534 | A | 5/1997 | Ashley et al. |
| 6,170,623 | B1 | 1/2001 | Eismann et al. |
| 6,510,931 | B2 * | 1/2003 | Berger et al. ................ 192/3.58 |
| 2002/0125094 | A1 | 9/2002 | Zimmermann et al. |

FOREIGN PATENT DOCUMENTS

| DE | 102 24 062 | 7/2003 |
| EP | 0 949 430 | 10/1999 |
| EP | 1 300 614 | 4/2003 |
| EP | 1 564 448 | 8/2005 |
| EP | 2 053 280 | 4/2009 |

* cited by examiner

*Primary Examiner* — Bret Hayes
(74) *Attorney, Agent, or Firm* — Schlee IP International, P.C.; Alexander R. Schlee

(57) ABSTRACT

A method for reaching a neutral position N located between two end positions of a gearshift fork in a shift transmission in a motor vehicle from a starting position of the gearshift fork. The method allows finding the neutral position of the gearshift fork without a sensor determining the position of the gearshift fork or in the alternative in case such the sensor is defect.

11 Claims, 8 Drawing Sheets

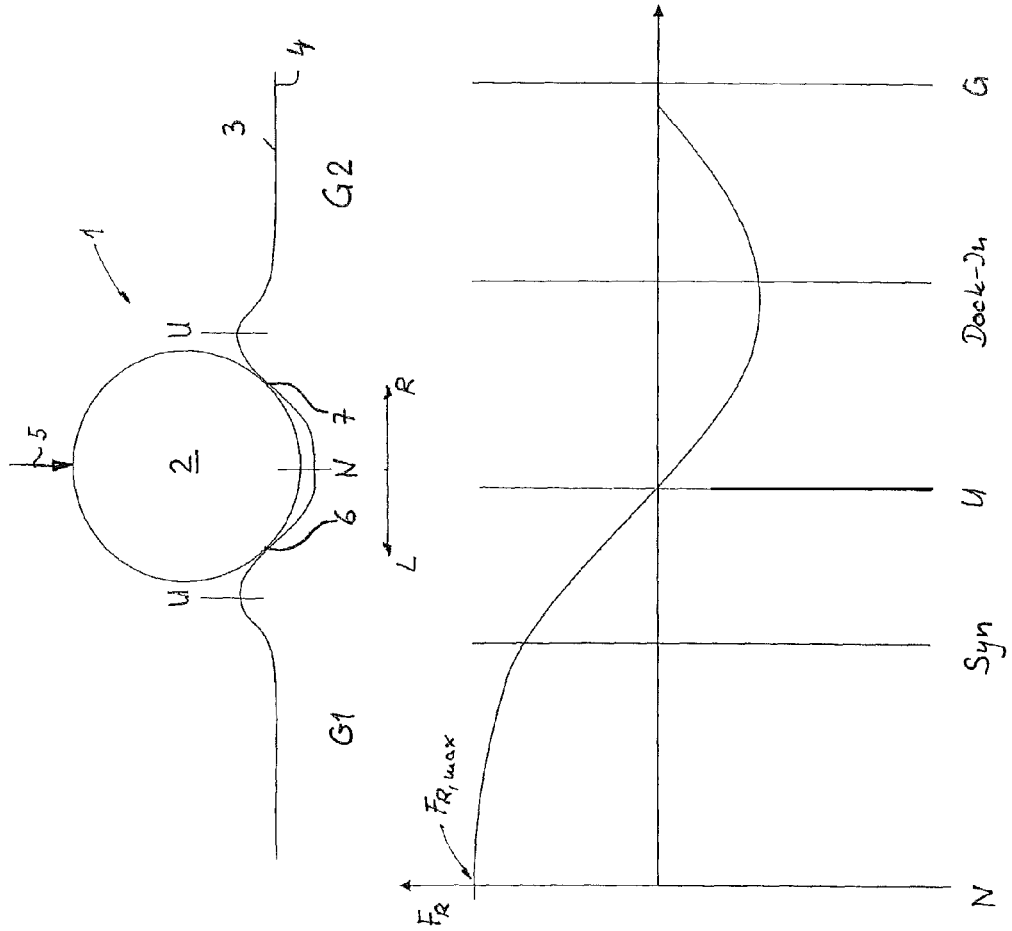

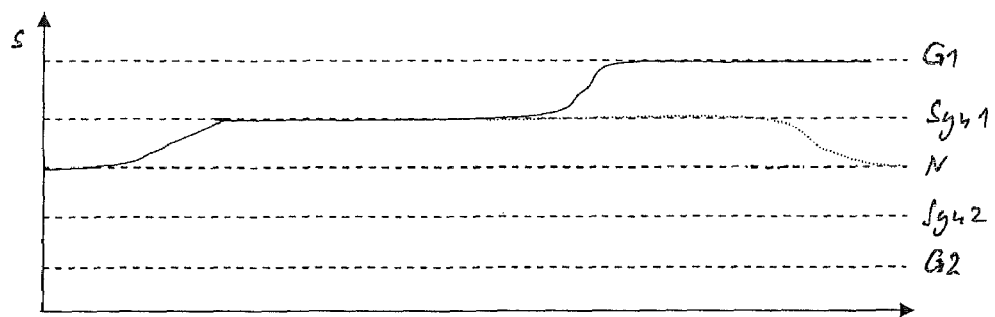
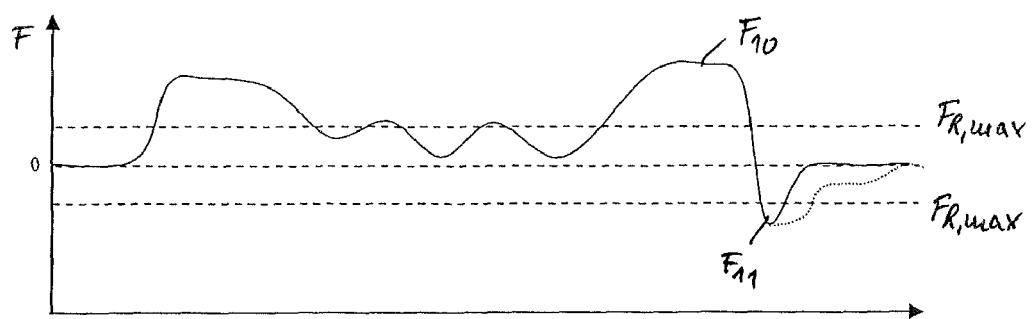
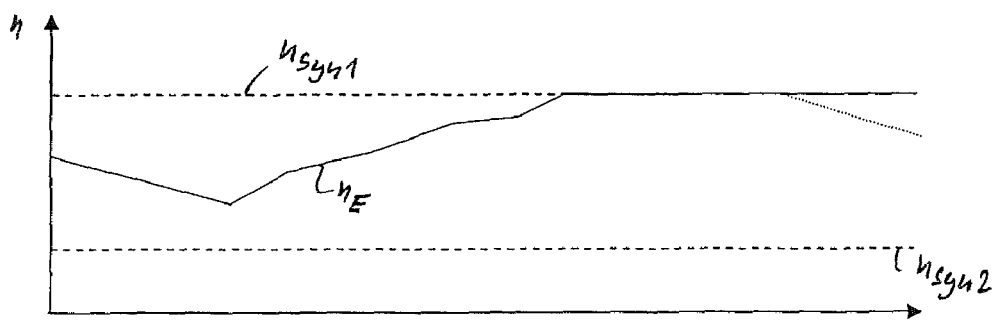
Fig. 9

METHOD FOR REACHING A NEUTRAL POSITION OF A GEARSHIFT FORK IN A SHIFT TRANSMISSION

CROSS REFERENCE TO RELATED APPLICATION

This application claims the priority right from the European patent application EP 07119124.1 that was filed on Oct. 23, 2007, the content of which is herewith incorporated in its entirety by reference.

BACKGROUND OF THE INVENTION

The invention relates to a method for reaching a neutral position located between two end positions of a gearshift fork in a shift transmission of a motor vehicle.

From the EP 1 300 614 A2 a method for finding a neutral position of a gearshift fork is known. The gearshift fork can be moved between two end positions in two directions. If the gearshift fork is positioned in one of its end positions, a gear of the shift transmission is engaged. For engaging a gear, starting from the neutral position, the gearshift fork passes through a synchronization point related to the particular gear, wherein the rotational speed of an input shaft of the shift transmission is synchronized with the rotational speed of an output shaft. After passing beyond the synchronization point, a positive interlocking is performed between a loose wheel that relates to the respective gear and a shaft (input shaft or output shaft) supporting the loose wheel. By means of this positive interlocking between the loose wheel and the respective shaft the gear is engaged.

According to the EP 1 300 614 A2 a latching force acts upon the gearshift fork or the shifting rod that is part of the gearshift fork, said latching force urging the gearshift fork in the direction of the neutral position when closer to the neutral position, and away from the neutral position when the gearshift fork is more remote from the neutral position. The method according to the EP 1 300 614 A2 focuses on finding the neutral position when the gearshift fork is already close to the neutral position and the latching force pushes the gearshift fork in the direction of the neutral position. For finding this approximate neutral position the EP 1 300 614 A2 suggests to determine the two end positions of the gearshift fork or the two end positions of a shifting sleeve that are moved by means of the gearshift fork and to determine by calculating the arithmetic mean value of the distance between the end positions the neutral position that is typically provided in the middle between the end positions. This, however, requires at least one sensor for determining the position or the position change of the gearshift fork.

In case of failure of the sensor S4 in determining the position, the method according to the EP 1 300 614 A2 can no longer be performed. It is no longer possible to find the neutral position reliably.

SUMMARY OF THE INVENTION

It is an object of the invention to create a method allowing measures that are as simple as possible to find the neutral position reliably.

The method according to claim 1 comprises two steps. At first, in a step S1, the gearshift fork is subjected to a first actuating force $F_1$ acting in one of two possible directions, wherein the actuating force $F_1$ is higher than the maximum latching force. In step S2 the step S1 is terminated by means of at least one of the following termination criteria:

a) a certain first time period $\Delta t_1$ is exceeded;
b) in step S1, a fast change of the ratio of the rotational speed of the input shaft in comparison to the rotational speed of the output shaft is occurs;
c) the input shaft and the output shaft no longer rotate in synchronization.

The method according to the invention can be performed without any sensor for determining the position of the gearshift fork. This means, when the position sensor in a shift transmission fails, the neutral position can still be found reliably.

As already mentioned above, depending on the position of the gearshift fork the latching force acts in two different directions. Close to the neutral position latching is provided, urging the gearshift fork in the direction of the neutral position. The latching mechanism comprises preferably a latching curve and a latching body, for instance in the form of a spring biased ball or roller, wherein the latching curve is preferably designed so as to provide a maximum latching force in the neutral position.

During the latching action, the latching body is pressed with a particular force against the latching curve. The latching force is therefore the force resulting from the interaction between the latching body and the latching curve in the moving direction of the gearshift fork and onto that gearshift fork.

According to a preferred embodiment the method starts from a starting position in which one gear of the shift transmission is engaged. The step S1 is preceded by a step S0. In step S0, a clutch of the motor vehicle is opened separating the transmission or a partial transmission that relates to the engaged gear from the power of the motor vehicle. Further, it is determined in step S0 that the actuating force $F_1$ acts in the direction of the neutral position. Whether a gear is engaged and if so what gear is engaged can be determined by measuring the rotational speeds of the input shaft and the output shaft. If these rotational speeds (during a certain period of time) are in a constant ratio, knowing the transmission ratios for each gear in the shift transmission, the engaged gear can be identified reliably. If the engaged gear is identified, also the direction can be identified clearly into which gearshift fork has to be moved for reaching the neutral position starting from this engaged gear.

In a preferred embodiment in step 2 only the termination criterion a) is considered. The other two termination criteria b) and c) are not checked. According to the termination criterion a) the gearshift fork is only subjected over a time period $\Delta t_1$ by the force $F_1$. The time period $\Delta t_1$ is preferably chosen to be high enough so that the gearshift fork is pressed from the engaged gear into a section where the latching force starts urging the gearshift fork into the neutral position. If the latching force is higher than the frictional force that has to be overcome, the gearshift fork reaches the neutral position by means of the latching action.

After step S2 the gearshift fork can be subjected over a second time period $\Delta t_2$ in the same direction with a second actuating force $F_2$ that is smaller than the maximum latching force. By limiting the force $F_2$ it is achieved that the gearshift fork, starting from the engaged gear, is not moved beyond the neutral position. This is achieved when the latching force assumes a maximum value in the neutral position, wherein a movement of the gearshift fork from the neutral position is counteracted by the latching force.

In the alternative, in step S2, the gearshift fork is subjected in the same direction over a third time period $\Delta t_3$ to a third actuating force $F_3$ that is lower than the actuating force $F_1$ and higher than the maximum latching force. The time period $\Delta t_3$ has to be limited. The time period $\Delta t_3$ is shorter than the time period that is required for a synchronization of the rotational speeds of the input and output shafts, namely for the gear that is located opposite the gear that was engaged at the beginning of the method. According to this alternative method, if the frictional forces are not too high, due to the force $F_3$, the gearshift fork is moved starting from the engaged gear beyond the neutral position and is stopped at the synchronization point of the gear on the opposite side due to the synchronization starting at this point. By means of limiting the time period $\Delta t_3$ it is achieved that the gearshift fork is not moved beyond the synchronization point of the opposite gear, but, as far as the latching force in that synchronization point is directed in the direction of the neutral position, pushed back into the neutral position by that latching force. In this connection it is pointed out that the latching forces in the area of the neutral position and in the area of the synchronization point are substantially higher than the occurring frictional forces, wherein it has to be considered that the frictional forces are strongly dependent on the temperature in the transmission.

Further, it is possible that in step S2 only the termination criterion b) is taken into consideration. This is based on the determination that a strong change in the rotational speed of the input shaft in relation to the rotational speed of the output shaft occurs only when the gearshift fork is moved starting from an engaged gear beyond the neutral position to the synchronization point of the opposite gear and at this point there is an acceleration or deceleration due to the starting synchronization of the input shaft. Accordingly, in step S2 the gearshift fork is subjected over a fourth time period $\Delta t_4$ in the opposite direction with a fourth actuating force $F_4$ that is smaller than the maximum latching force. The force $F_4$ is therein directed towards the neutral position. Limiting the maximum latching force achieves that the force $F_4$ of the gearshift fork does not push said gearshift fork beyond the neutral position, since the maximum of the latching force is reached in the neutral position.

In the alternative, in step S2 the gearshift fork can be subjected in the opposite direction over a fifth time period $\Delta t_5$ to a fifth actuating force $F_5$ that is lower than the actuating force $F_1$ and higher than the maximum latching force. Subjecting the force $F_5$ ends after the time period $\Delta t_5$ that is shorter than the time period that is required for a synchronization of the rotational speeds of the input and output shafts. By limiting the time period of subjection to force $F_5$ it is achieved that after reversing the direction of the gearshift fork it is not positioned for too long a time period at the synchronization point of the gear that had just been disengaged. Also in this case appropriately dimensioned latching action accomplishes that the latching force slides the gearshift fork from the synchronization point of the initially engaged gear into the neutral position.

Further, it can be provided that in the step S2 only the termination criteria c) is considered wherein it is checked whether the input shaft and the output shaft are rotating in synchronization with each other. If such a synchronized rotation is no longer present, since due to the missing positive interlocking between the output shaft and the input shaft of the rotational speed of the input shaft decreases, after step S2 the gearshift fork is subjected over a sixth time period $\Delta t_6$ in the same direction with a sixth actuating force $F_6$ that is smaller than the maximum latching force. In this case, it is taken advantage that the non-synchronized rotation between the output shaft and input shaft is an indicator for the fact that the gear is no longer engaged and therefore the gearshift fork has already moved away from the end position that is related to the gear. The force $F_6$ is therein sufficient to move the gearshift fork further in the direction of the neutral position.

After expiration of the time period $\Delta t_6$ for the actuating force $F_6$ the direction of that actuating force $F_6$ is reversed likewise only to act over the time period $\Delta t_6$. This reversing of the direction can be repeated several times, wherein the absolute value of the force $F_6$ and/or the time period $\Delta t_6$ can be reduced successively. In this embodiment the gearshift fork is moved in the area of the neutral position back and forth until the method finally ends and the gearshift fork is finally positioned safely in the neutral position.

According to a preferred embodiment, all three termination criteria are checked, and depending on the criterion that has been met, different procedural steps are started. Preceding the step S1 the step S0' can be performed. In this step S0' it is first identified whether a gear is engaged, wherein in case of a successful identification the actuating force $F_1$ in the direction of the neutral position is established, and after an unsuccessful identification the actuating force $F_1$ acts in the direction of a higher gear and wherein the clutch of the motor vehicle is opened, separating the transmission or a transmission part that relates to the identified or a higher gear from the power of the motor vehicle.

After the steps S0', S1 and S2 further steps S3 and S4 can follow. In step S3, after start of the termination criteria b) is met, the actuating force $F_1$ is turned off, while when meeting the termination criteria a) or c) the gearshift fork is subjected in the same direction to a seventh actuating force $F_7$ that is lower than the actuating force $F_1$, wherein subjecting to the actuating force $F_7$ is turned off after a seventh time period $\Delta t_7$ or ends when a fast change of the rotational speed of the input shaft occurs. In the step S4, if the actuating force $F_7$ has not been turned off due to a fast change of the rotational speed of the input shaft, the method is repeated in the opposite direction of movement with the steps S1-S4 if the rotational speed ratios remain the same. If the rotational speed remains the same, apparently the gearshift fork was pushed in the direction of the engaged gear so that the gear has not been disengaged. In this case, the chosen direction of the forces $F_1$ and $F_7$ was wrong and is reversed in step S4. According to a preferred embodiment, the moving speed of the gearshift fork is limited. In case of hydraulic actuators, this can for instance be achieved by flow resistance allowing a particular maximum volume flow rate. In case of electric actuators only a maximum voltage or actuating frequency can be provided.

The values for the time periods $\Delta t_1$ to $\Delta t_7$, the rotational speed changes, further rotational speed values as well as the values for the actuating forces $F_1$ to $F_7$ can be determined depending on the temperature and the presumably engaged gear.

BRIEF DESCRIPTION OF THE DRAWINGS

The invention is described in more detail by referring to the embodiments shown in the drawings. The drawings show in:

FIG. 1 schematically a latching curve and a latching body;

FIG. 2 the diagram of the latching force over a gearshift fork path;

FIG. 9 the gearshift fork path, actuating force and rotational speed of the input shaft over time in a seventh embodiment.

DETAILED DESCRIPTION OF THE DRAWINGS

Figure 3:
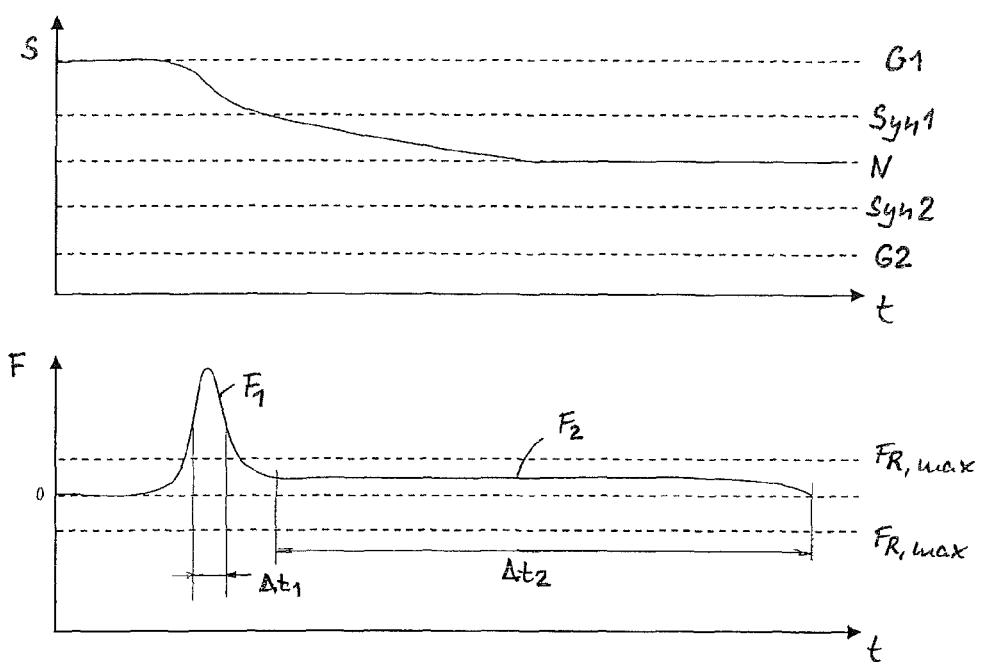
FIG. 3 the gearshift fork path and the actuating force over time in a first embodiment.

FIG. 1 shows a latching mechanism 1, comprising a ball-shaped latching body 2 and a latching curve 3. The latching curve 3 is part of a gearshift fork 4 as part of a shift transmission in a motor vehicle. In particular, the latching curve 3 can be provided on an enclosing outer surface of a shifting rod that is part of the gearshift fork 4 and can be disposed in relation to a transmission that is not shown so that it can be moved into opposing directions L, R. The directions L, R are linear in FIG. 1, but can also be of a circular shape, i.e. result from a rotational movement.

The latching body 2 is pressed by a force against the latching curve 3 as depicted by the arrow demoted 5. The force pressing the latching body 2 against the latching curve 3 can for example be a spring force. The latching curve 3 should be symmetrical in relation to a neutral position N.

If the gearshift fork 4 and therefore the latching curve 3 are shifted in direction L or in direction R, a latching force $F_R$ counteracts this movement due to the latching body being biased by a spring force. The diagram shows the latching force $F_R$ over the shifting force path s as is shown in FIG. 2 for a range reaching from the neutral position N up to one of the end positions of the shifting force, in which the gear G is engaged. In FIG. 1, 2 gears G1 and G2 are disposed on opposite ends.

By means of the shifting rod 4 a shifting sleeve can be moved along a shaft comprising two loose wheels that are disposed in an axial distance with respect to each other. Each of the loose wheels comprises teeth that can be brought into engagement with the shifting sleeve that rotates together with the shaft if the loose wheel and the shaft rotate with the same rotational speed. This synchronization of the shaft and the loose wheel is achieved by means of a synchronizing unit. Each loose wheel can be provided for one gear. If the gear is in engagement, the teeth of the shifting sleeve and of the respective loose wheel are in engagement with each other.

In the neutral position N, i.e. in that position of the latching curve 3 in relation to the latching body 2 as shown in FIG. 1, the latching force $F_R$ comprises a maximum that is denoted with $F_{R,max}$. This force $F_R$, max keeps the gearshift fork 4 in the neutral position N as long as no higher force acts into one of the directions L or R. In the neutral position N the latching body stands at two points 6, 7 in contact with the latching curve 3 (FIG. 1). In all other positions, a one-point contact between the latching body 2 and the latching curve 3 is established.

As shown in FIG. 2, the latching force $F_R$, starting from the neutral position N, up to a reverse point, is positive. This means that a movement of the gearshift fork 4 from its neutral position is counteracted by the force $F_R$. Due to this force, a positive latching force $F_R$ presses the gearshift fork 4 in direction of the neutral position when it is in the range between the neutral position N and the reverse point U.

Beyond the reverse point U the latching force $F_R$ is negative. This results in that beyond the reverse point U the gearshift fork is forced away from its neutral position. The reverse point U in FIG. 2 corresponds with the reverse point U depicted in FIG. 1 at the local maximum of the latching curve 3.

The range of movement of the shifting rod 4 is limited by two end positions in which one of the gears G1, G2 are engaged, respectively. If the gearshift fork 4 is moved in direction L into the left end position, a gear G1 should be engaged. Correspondingly, in the opposite direction R, an opposite gear G2 should be engaged when the other end position is reached.

When moving in the direction of a gear G, at first a synchronizing point Syn is reached. In this synchronizing point the rotational speed of the loose wheel of the gear that is to be getting engaged is synchronized with the rotational speed of the shaft. After synchronization, a positive interlocking between the teeth of the shifting sleeve and of the loose wheel is established, as denoted in FIG. 2 with "Dock-in". After the teeth have come into engagement, the shifting rod is moved further so as to finally reaching its end position in which the gear is fully engaged.

In the following it is assumed that the two loose wheels are supported on an output shaft of the transmission and stand in engagement with fixed wheels on an input shaft of the transmission. For establishing a positive interlocking between the shifting sleeve and one of the loose wheels, the rotational speeds of the input shaft and the output shaft have to be synchronized.

By referring to the FIGS. 3-9 embodiments of the invention are discussed as to how the gearshift fork 4 can be shifted into a desired position. The gearshift fork 4 is operated by an actuator that has not been shown here, and exerts an actuating force on the gearshift fork 4. The actuating force over time is shown according to a first embodiment in the lower part of FIG. 3. Starting point of the process is assumed to be the engaged gear G1 (see upper part of FIG. 3). For moving from the engaged gear G1 into the neutral position N, for a predetermined first period of time $\Delta t_1$ a first actuating force $F_1$ is exerted on to the gearshift fork, pressing the gearshift fork 4 in direction of the neutral position N. Subjecting with the force $F_1$ results in that the gearshift fork passes a synchronization point Syn1 that relates to gear 1. Thereafter, the gearshift fork is subjected to a second actuating force $F_2$ acting into the same direction as the force $F_1$, but is smaller than the maximum latching force $F_{R,max}$. At this point in time, two forces act on the gearshift fork 4, namely on the one hand the latching force $F_R$ according to the diagram shown in FIG. 2, as well as the actuating force $F_2$. Both of these forces are counteracted by frictional forces. The sum of the actuating force $F_2$ and the latching force $F_R$ accomplishes that the gearshift fork is brought into the neutral position N. After expiration of the second time period $\Delta t_2$ the actuating force $F_2$ is turned off. When the gearshift fork has reached its neutral position and the latching body 2 contacts at the points 6, 7 the latching curve 3, a further movement of the gearshift fork 4 in direction of the actuating force $F_2$ is now counteracted by the latching force $F_R$, namely by the maximum latching force $F_{R,max}$. Since the actuating force $F_2$ is smaller than the maximum latching force $F_{R,max}$, the gearshift fork is not moved beyond the neutral position N. In the upper part of FIG. 3, additional, generally reachable positions for the shifting rod 4 are shown. This is a gear G2 that is located on the opposite end in relation to gear G1, and its respective synchronizing point Syn2. However, these two positions are not established in the process according to FIG. 3. The process according to FIG. 1 also assumes the engaged gear G1 as the starting point. Shown are the diagrams of the shifting rod path s, the actuating force F and the rotational speed of the input shaft.

For shifting the gearshift fork 4 from this point into the neutral position N, the gearshift fork is subjected to a fourth actuating force $F_4$ in direction of the neutral position N that is higher than the maximum latching force $F_{R,max}$. The turning off criteria for the actuating force $F_4$ is exceeding a limit value for the gradient of the rotational speed $n_E$ of the input shaft. A fast decrease in the rotational speed $n_E$ (denoted by the reference numeral 8) when starting from the gear G1 indicates that the synchronization point Syn2 of the opposite gear G2 is reached (see point 9), wherein the gear G2 is a higher gear compared to gear G1. As it can be gathered from the diagram of the gearshift fork path s over time (upper part of FIG. 4), the gearshift fork passes through the neutral position and is moved up to the synchronization point Syn2 at which due to the start of the synchronization action a strong reduction of the rotational speed $n_E$ of the input shaft results. After reaching the respective turning off criteria, the gearshift fork is subjected in opposite direction to a fifth actuating force $F_5$ that is smaller than the maximum latching force $F_{R,max}$. After a certain fifth time period $\Delta t_5$ the actuating force $F_5$ is turned off. Due to the actuating force $F_5$ and the latching force $F_R$ the gearshift fork is pushed safely back into the neutral position N.

Figure 4:
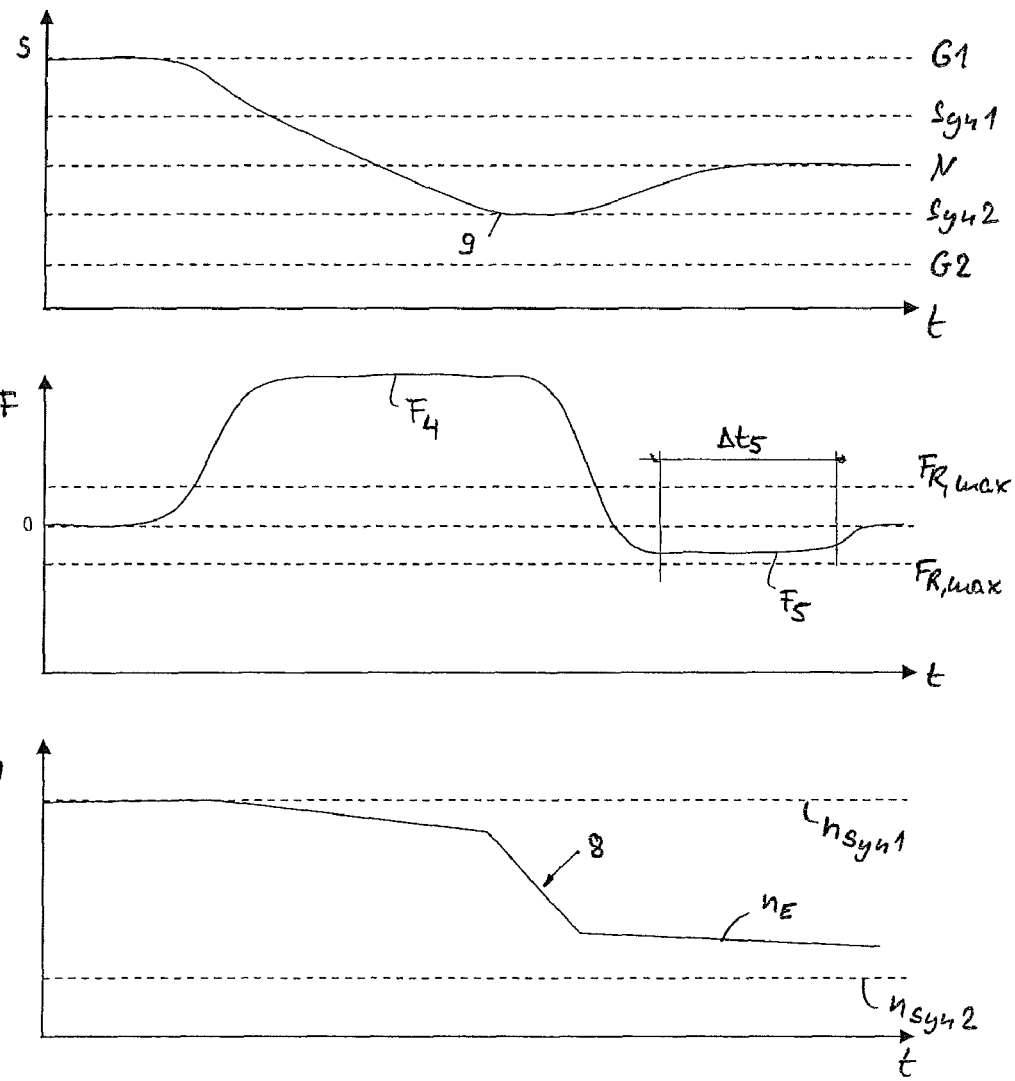
FIG. 4 the gearshift fork path, actuating force and rotational speed of an input shaft over time in a second embodiment.
Figure 5:
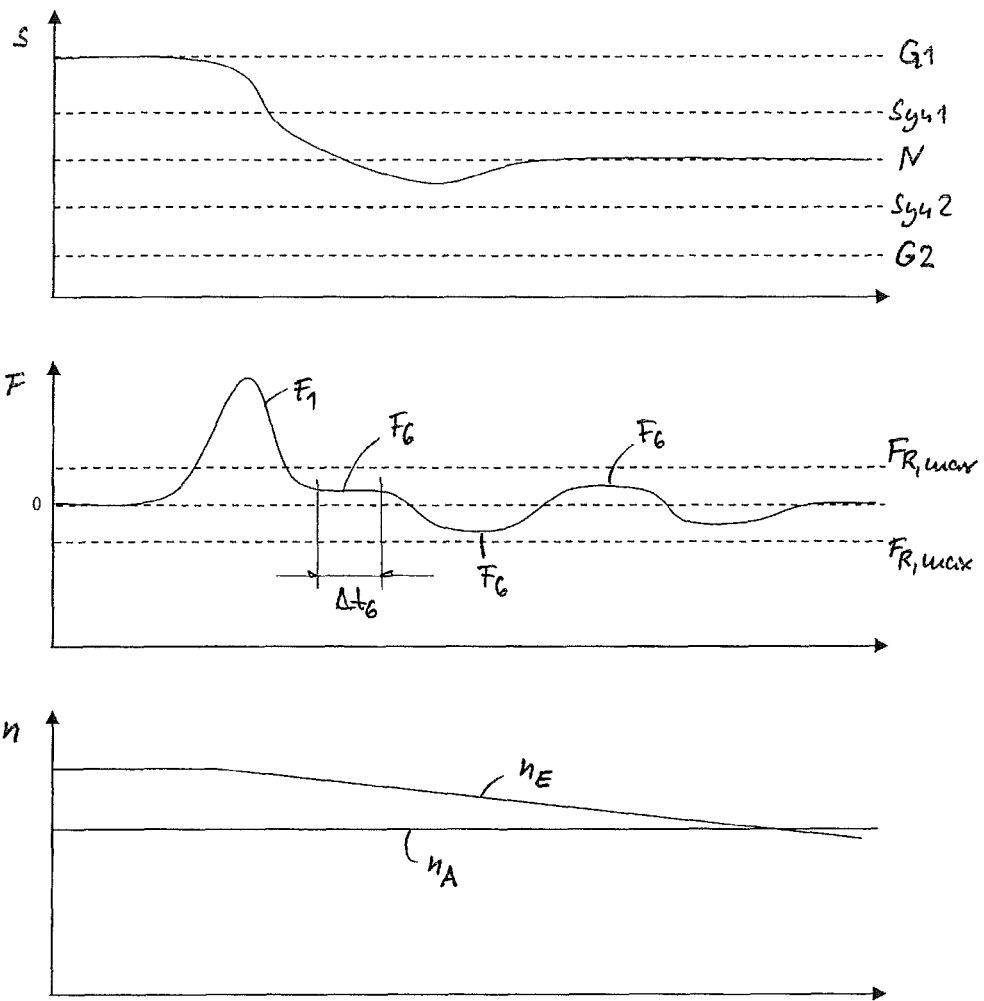
FIG. 5 the gearshift fork path, actuating force and rotational speed of an input shaft and an output shaft over time in a third embodiment.

The diagram shown in FIG. 5 that is similar to FIG. 4 demonstrates a further embodiment. Also here, the starting point is the engaged gear G1. The gearshift fork 4 is pushed by a force $F_1$ in direction of the neutral position N. This opens the positive interlocking between the teeth of the shifting sleeve and a loose wheel, so that the rotational speed $n_E$ of the input shaft slightly decreases due to friction. If the relation between the rotational speeds of the input shaft and the output shaft exceeds a certain threshold of value, the actuating force $F_1$ is turned off and a new actuating force, namely the sixth actuating force $F_6$ is established. The actuating force $F_6$, however, is lower than the maximum latching force $F_{R,max}$. The actuating force $F_6$ accomplishes that the gearshift fork is pushed further into the neutral position N. Due to dynamic effects it might happen that the gearshift fork is moved beyond the neutral position N, as this is demonstrated by the diagram showing the shifting rod path over time.

After expiration of a sixth time period $\Delta t_6$ the actuating force $F_6$ is reversed and is also established for a limited time period. This reverse of the direction of the force happens several times so that the neutral position is reached safely.

Figure 6:
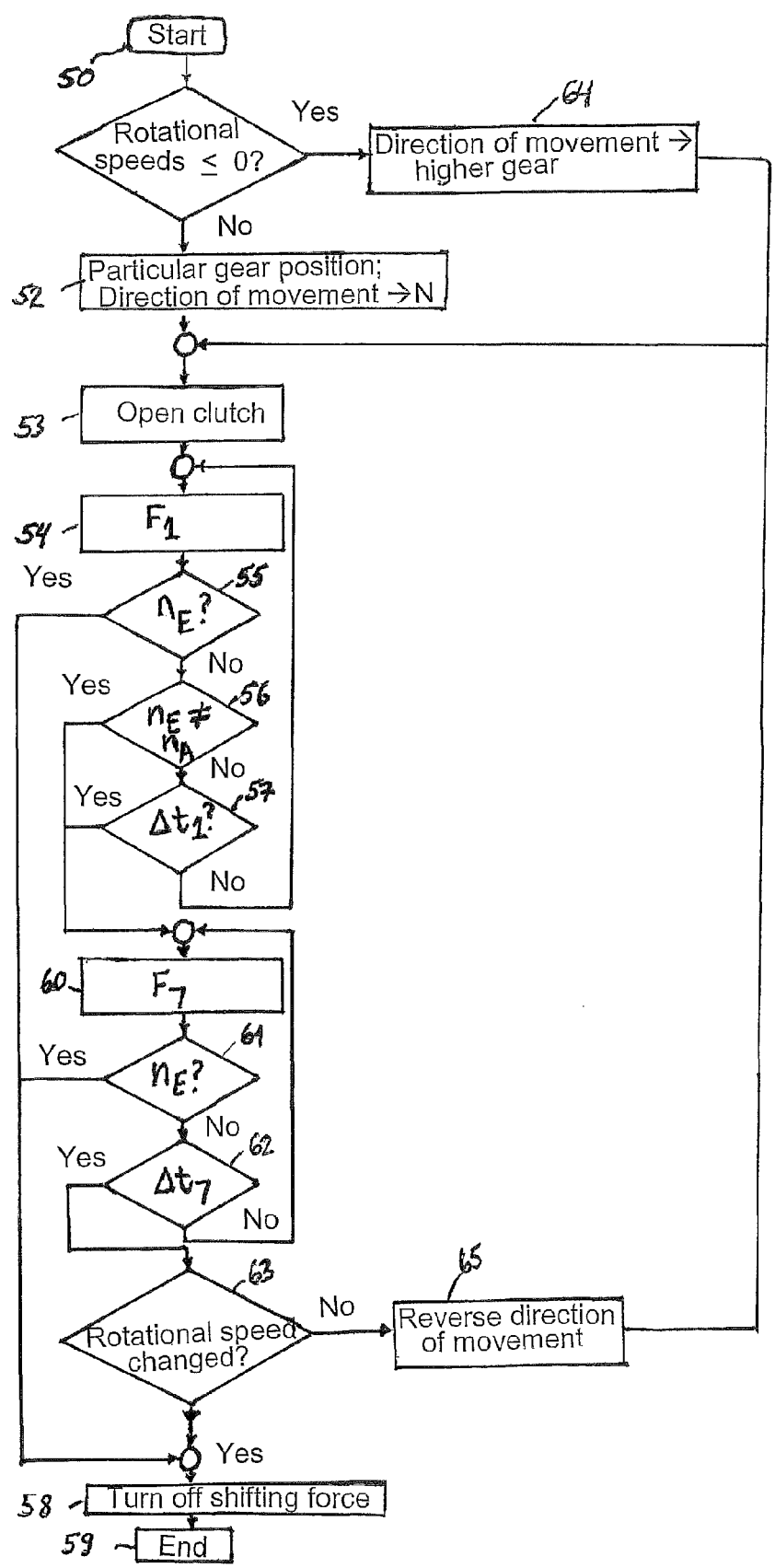
FIG. 6 a flow diagram of a fourth embodiment.

FIG. 6 shows a flow diagram of a further embodiment. After the start 50 it is determined at 51 whether the input shaft and the output shaft are rotating. If so, by the knowledge about the gear transmission ratio of each gear the particular gear that is currently engaged can be determined. This is achieved in the step denoted 52. In addition, the direction of movement is determined for the gearshift fork. Following the step 52 is a step 53, in which the clutch is opened and wherein the transmission or the partial transmission that relates to the respective gear is separated from the power of the motor vehicle. Thereafter, a shifting rod is moved by a force $F_1$ that is higher than the maximum latching force (compare step 54). When subjected to the force $F_1$, continuously, three determinations 55 to 57 are made.

In determinations 55 it is checked whether the gradient of the rotational speed of the input shaft exceeds a certain threshold of value or whether the rotational speed of the input shaft comes close to a rotational speed the input shaft assumes after synchronization with the opposite gear. If a high gradient of the rotational speed $n_E$ is determined, the shifting rod was moved starting from the engaged gear beyond the neutral position N and is at the synchronization point of the opposite gear. The force $F_1$ is then turned off at a step 58 and the process is terminated (compare step 59). Since the shifting rod is a position in the synchronization point of the opposite gear, the shifting rod, according to the latching force the diagram according to FIG. 2, is pushed into the neutral position N.

If in determination 55 the established threshold value for the gradient of the rotational speed of the input shaft is not exceeded, in the subsequent determinations 56 it is checked whether the input shaft is still synchronized with the output shaft. If such a synchronized rotation is no longer established, a new seventh actuating force $F_7$ is established in step 60 that is smaller than the maximum latching force $F_{R,max}$.

Step 60 is also reached when a predetermined period of time $\Delta t_1$ expired during which the shifting rod is subjected to force $F_1$ (compare determinations 57). While subjected to the actuating force $F_7$ it is checked by the determinations 61 and 62 whether the rotational speed of the input shaft comes close to a certain extent to the rotational speed that would be established after synchronization of the opposite gear G2. If this is the case, the gearshift fork was moved beyond the neutral position N up to the opposite synchronization point and the actuating force is turned off in step 58.

If during the determination 62 a seventh time period $\Delta t_7$ has expired, it is checked in determination 63 whether the rotational speed ratio between input shaft and output shaft as determined during step 52 has changed. If that is the case, likewise the actuating force is turned off (compare steps 58, 59).

If determination of the rotational speeds of the input shaft and the output shaft in determination 51 was not possible and therefore it was impossible to determine the engaged gear, a direction for movement of the shifting rod in direction of the higher gear is determined (step 64). With this direction of movement that had been determined in step 64 the process is run starting with a step 53 up to the end denoted 59. In this case, the chosen direction of movement of the shifting rod might be wrong. For example, the shifting rod could be pushed in direction of a gear that has already been engaged in the process shown in FIG. 6, without the prospect of reaching the neutral position N. Determination 63 is provided for identifying such a case and for making sure in step 65 that the direction of movement for the shifting rod is reversed. Therefore, it is possible by running through the steps 53 up to the end 59 to reach the neutral position N.

Figure 7:
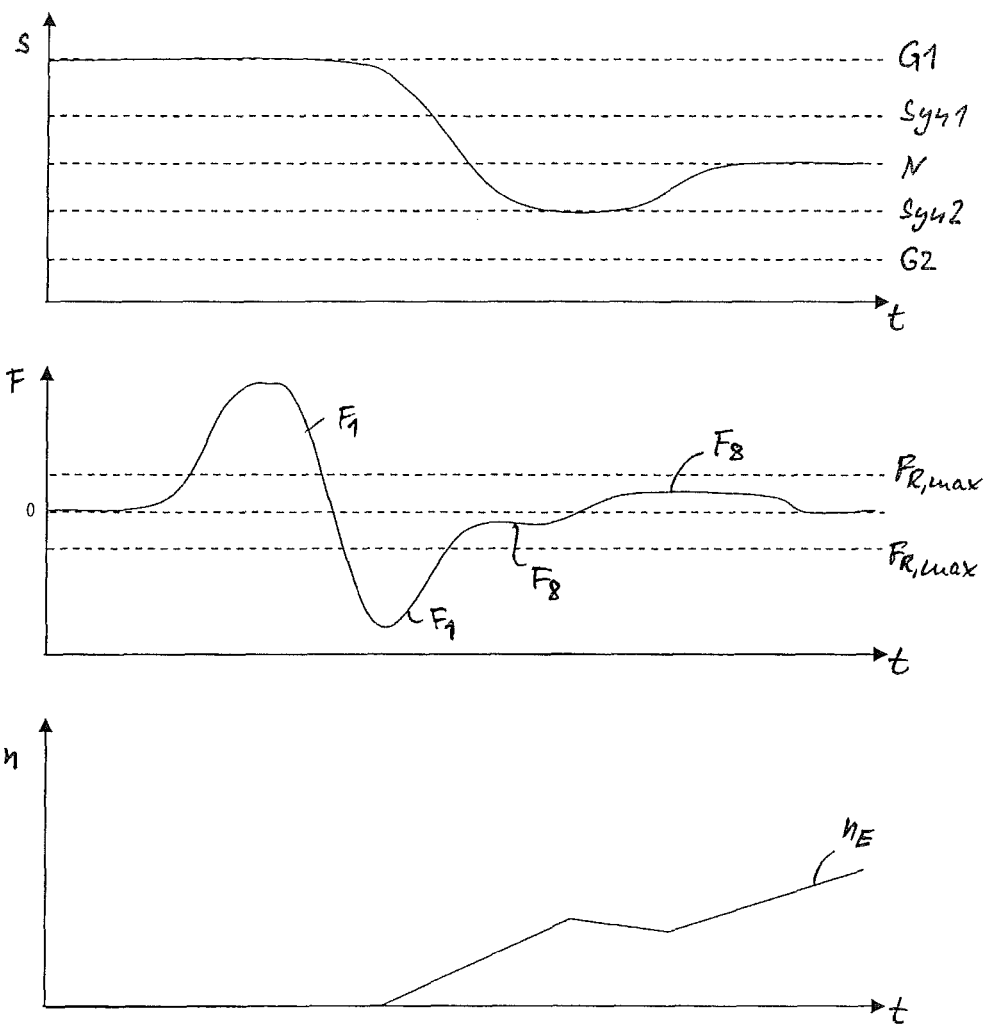
FIG. 7 the gearshift fork path, actuating force and rotational speed of an input shaft over time in a fifth embodiment.
Figure 8:
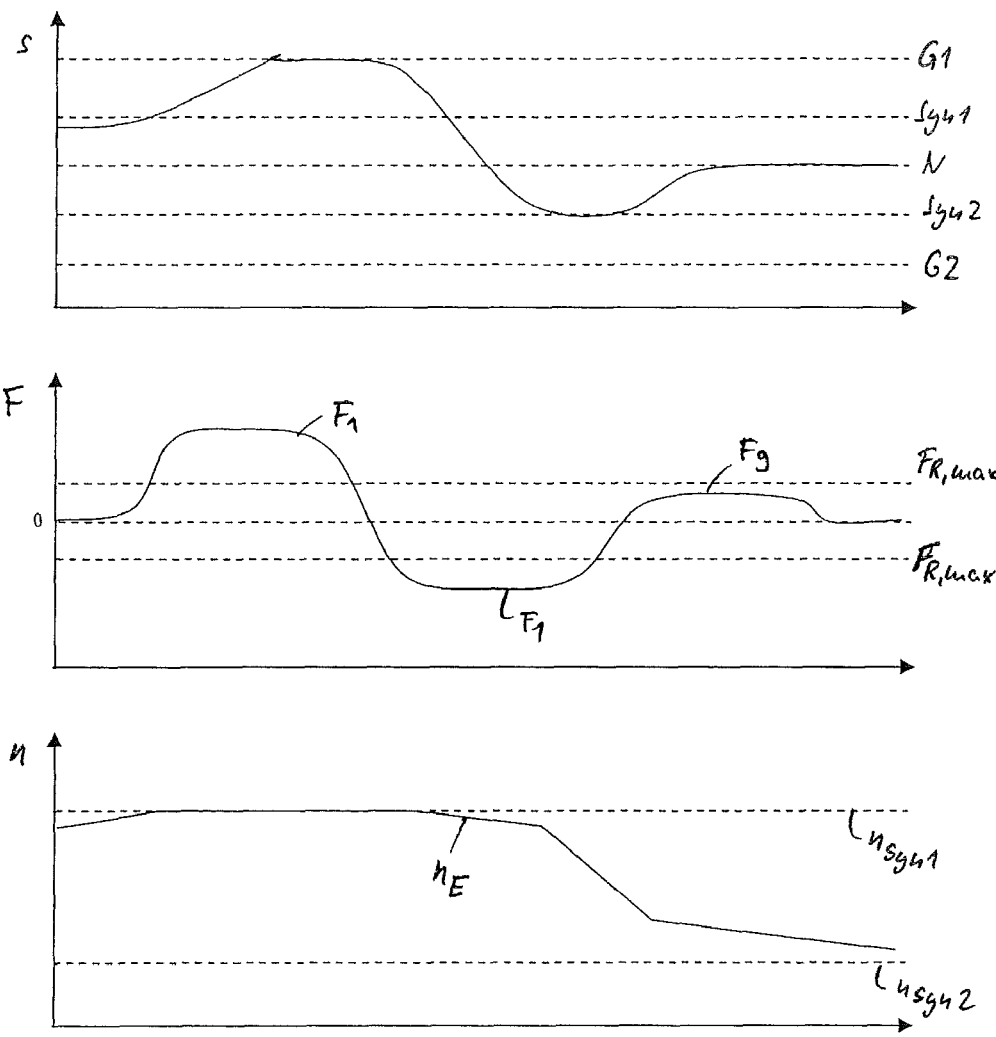
FIG. 8 the gearshift fork path, actuating force and rotational speed of the input shaft over time in a sixth embodiment.

The embodiment shown in FIG. 7 provides a method by means of which in case of a non-moving motor vehicle the neutral position can be reached safely. For accomplishing this, the clutch is slightly closed while the vehicle break is activated, so that the input shaft is subjected to a low torque. Thereafter, the shifting rod is subjected to a force $F_1$ acting into one of the directions L, R. If no change in the rotational speed of the input shaft results after a certain time, the direction of the force $F_1$ is reversed. In this case, the input shaft could not receive any rotational speed, since the engaged gear established a positive interlocking with the non-rotating output shaft. Since now the actuating force is reversed and does now act into a different direction, i.e. into the direction of the neutral position N, the gear that had been engaged so far is disengaged, resulting in that due to the still slightly closed clutch the input shaft rotates increasingly faster. If the change in the rotational speed $n_E$ of the input shaft is determined, the force $F_1$ is reduced to an eighth force $F_8$ that is smaller than the maximum latching force $F_{R,max}$. If then, as shown in the diagram of the shifting rod path s over time, the opposite synchronization point Syn2 is reached, the force $F_8$ is reversed. The reaching of the synchronization point Syn2 is determined by a decrease in the rotational speed $n_E$ of the input shaft. Finally, after a certain period of time, the force $F_8$ can be turned off that was chosen such so that until then the shifting rod was able to safely reach the neutral position N.

In contrast to the embodiments discussed above the embodiment shown in FIG. 8 assumes that no gear has been engaged. After opening the clutch the shifting rod is moved into any direction by force $F_1$ that is higher than the maximum latching force $F_{R,max}$. If the ratio of the rotational speeds of the input shaft and the output shaft comes close quickly to the synchronization rotational speed $n_{Syn1}$ of the respective gear G1, the synchronization point Syn1 of the gear G1 was reached or exceeded. If after a certain period of time the input shaft still rotates with the synchronization rotational speed $n_{Syn1}$, the direction of force is reversed since then the gearshift fork was pushed into the direction of gear that has already been engaged. If now a fast change in the rotational speed $n_E$ of the input shaft towards the synchronization rotational speed $n_{Syn2}$ of the opposite gear occurs the synchronization point Syn2 of the respective gear has been reached. Thereafter, the shifting rod is subjected to a lower ninth actuating force F9 acting into the opposite direction that is smaller than the maximum latching force $F_{R,max}$. This allows reaching the neutral position N safely. At the end of the process the rotational speed $n_E$ of the input shaft decreases further due to friction while the clutch is opened.

FIG. 9 shows a process by means of which starting from the neutral position N a gear G1 can be engaged. At first, the clutch is opened, so that the input shaft is separated from the power. Thereafter, movement under controlled speed to the synchronization point Syn1 follows. In case of a hydraulic actuator by means of a flow resistance and a pressure control a predetermined volume flow is established that relates to the desired speed. If the speed of the input shaft changes fast in direction of the synchronization rotational speed $n_{Syn1}$ the synchronization point Syn1 has been reached. Thereafter, the shifting rod is moved further under controlled pressure, wherein the control value is the deviation between the rotational speed $n_E$ of the input shaft and the synchronization rotational speed $n_{Syn1}$.

When the synchronization rotational speed $n_{Syn1}$ has been reached, the shifting rod is subjected to a tenth actuating force $F_{10}$ that is provided for reaching of the end position of the gear G1.

After a waiting period the clutch is closed for transmitting torque. Thereafter, the shifting rod is subjected to an eleventh actuating force $F_{11}$ acting in opposite direction. If the gear G1 has been finally engaged, an undercut in the teeth of the loose wheel prevents disengaging of the gear G1. If, however, the end position of G1 was not reached, the actuating force $F_{11}$ of the synchronization process is turned off and a deviation of the rotational speed $n_E$ of the input shaft and the synchronization rotational speed $n_{Syn1}$ results as this is depicted by the dotted line in the bottom diagram of FIG. 9. By means of the dotted line in the gearshift fork path over time it can be gathered that the gearshift fork is slid into the neutral position by the latching mechanism.

The invention claimed is:

1. In a motor vehicle, a method for failsafe disengaging of a gear and reaching a neutral position located between a first end position and a second end position of a gearshift fork in a shift transmission from a starting position of the gearshift fork where a first gear is engaged, said transmission being adapted to move the gearshift fork between the first end position where a first gear is engaged and a second end position where a second gear is engaged in a first direction and in a second direction; and synchronize a rotational speed of an input shaft of the shift transmission with a rotational speed of an output shaft of the shift transmission at a respective first synchronization point that is related to the first gear and a second synchronization point that is related to the second gear; said method comprising the steps of:
 applying a latching force to the gearshift fork that pushes the gearshift fork in a direction of the neutral position when located in a first position, and away from the neutral position when the gearshift fork is located in a second position that is more remote from the neutral position than the first position, wherein the latching force preferably reaches a maximum in the neutral position;
 applying in a step S1 from a starting position of the gearshift fork where the first gear is engaged a first actuating force to the gearshift fork that is higher than the maximum latching force, said first actuating force acting in one of the first and second directions and pushing the gear shift fork from the starting position where the first gear is engaged past the neutral position;
 terminating in a step S2 the step S1 by the termination criterion of a change of the ratio of the rotational speed of the input shaft in comparison to the rotational speed of the output shaft during the step S1 due to a beginning synchronization action while simultaneously the latching force pushes the gear shift fork back towards the neutral position.

2. The method according to claim 1, further comprising prior to conducting step S1 performing the following step:
 S0: opening a clutch of the motor vehicle separating the transmission or a partial transmission that relates to the engaged gear from power of the motor vehicle and determining that the actuating force acts in the direction of the neutral position.

3. The method according to claim 1, further comprising applying after step S2 a fourth actuating force to the gearshift fork over a fourth time period, wherein the fourth actuating force acts in the opposite direction than the first actuating force and is smaller than the maximum latching force.

4. The method according to claim 3, further comprising applying after step S2 a fifth actuating force to the gearshift fork over a fifth time period, wherein the fifth actuating force acts in the opposite direction than the first actuating force and is lower than the first actuating force and higher than the maximum latching force, wherein subjecting to the fifth force ends after the fifth time period that is shorter than the time period that is required for a synchronization of the rotational speeds of the input and output shafts.

5. The method according to claim 4, further comprising determining the fifth time period, rotational speed changes, as well the fifth actuating force depending on the temperature and the presumably engaged gear.

6. The method according to claim 3, further comprising determining the fourth time period, rotational speed changes, as well as the fourth actuating force depending on the temperature and the presumably engaged gear.

7. The method according to claim 1, further comprising checking in addition to the termination criterion of a change of the ratio of the rotational speed of the input shaft in comparison to the rotational speed of the output shaft also a termination criterion of exceeding a first time period chosen to be high enough so that the gearshift fork is pressed from the engaged gear into a section where the latching force starts urging the gearshift fork into the neutral position; and depending on any one of the two aforementioned criteria starting different procedural steps.

8. The method according to claim 1, wherein further comprising performing prior to the step S1 the following step:

S0': Attempting to identify whether a gear is engaged, wherein in case of a successful identification the first actuating force in the direction of the neutral position is established, and after an unsuccessful identification of whether a gear is engaged the first actuating force acts in a direction of a higher gear and wherein the clutch of the motor vehicle is opened, separating the transmission or a transmissions part that relates to the identified or a higher gear from power.

9. The method according to claim 8, wherein further comprising performing subsequently to the step S2 the following steps:

S3: when the termination criterion is met, turning off the first actuating force, and when a certain time limit has been reached, applying a seventh force to the gearshift fork, wherein the seventh force acts in the same direction than the first actuating force and is lower than the first actuating force, wherein applying the seventh actuating force is turned off after a seventh time period ends or when a change of the rotational speed of the input shaft occurs due to a beginning synchronization action;

S4: repeating steps S1-S4 when due to a change of the rotational speed of the input shaft the seventh actuating force has been turned off and the rotational speed ratio remains the same.

10. The method according to claim 1, further comprising limiting a moving speed of the gearshift fork.

11. The method according to claim 1, further comprising determining rotational speed changes as well as the first actuating force depending on the temperature and the presumably engaged gear.

* * * * *